(12) United States Patent
Menelly

(10) Patent No.: US 7,617,671 B1
(45) Date of Patent: Nov. 17, 2009

(54) METHOD AND APPARATUS FOR PURIFYING MOTOR EXHAUST FUMES

(76) Inventor: Richard Menelly, 18 Saco Rd., Alfred, ME (US) 04002

( * ) Notice: Subject to any disclaimer, the term of this patent is extended or adjusted under 35 U.S.C. 154(b) by 230 days.

(21) Appl. No.: 11/601,862

(22) Filed: Nov. 20, 2006

(51) Int. Cl.
*F01N 3/00* (2006.01)

(52) U.S. Cl. ............... 60/275; 60/274; 60/286; 204/264; 204/177; 204/179; 362/42; 362/540; 362/541; 422/186.04; 422/186.07; 422/186.3

(58) Field of Classification Search ............ 60/274, 60/275, 286, 295, 300, 303; 204/164, 177, 204/179; 362/42, 487, 499, 540, 541, 574; 422/186.04, 186.07, 186.3

See application file for complete search history.

(56) References Cited

U.S. PATENT DOCUMENTS

| | | | | |
|---|---|---|---|---|
| 6,029,442 | A * | 2/2000 | Caren et al. | 60/275 |
| 6,253,544 | B1 * | 7/2001 | Miller et al. | 60/275 |
| 6,471,377 | B1 * | 10/2002 | Stegall | 362/487 |
| 6,491,418 | B1 * | 12/2002 | Chen | 362/487 |
| 6,557,340 | B1 * | 5/2003 | Twigg et al. | 60/275 |
| 7,152,710 | B1 * | 12/2006 | Huang et al. | 181/227 |
| 7,272,925 | B2 * | 9/2007 | Gross et al. | 60/286 |

* cited by examiner

*Primary Examiner*—Binh Q Tran

(57) ABSTRACT

A motor exhaust ozonator adapter is connected with the end of a motor vehicle exhaust pipe for receiving and passing exhaust gas. One arm of the adapter is connected with the end of the exhaust pipe and another arm of the adapter houses a powerful ozone light for ozonating intake air. The ozonated air thereby converts carbon monoxide to carbon dioxide and oxidizes other noxious chemicals therein.

7 Claims, 3 Drawing Sheets

METHOD AND APPARATUS FOR PURIFYING MOTOR EXHAUST FUMES

BACKGROUND OF THE INVENTION

Methods are currently available for the attempted purification of motor exhaust fumes.

U.S. Pat. No. 6,086,657 entitled "Exhaust Emissions Filtering System" describes one such method connecting with the exhaust system.

U.S. Pat. No. 5,692,481 entitled "Method and Apparatus for Reducing Contaminants in Exhaust Gases of an Engine" describes partially converting the incoming air to an internal combustion engine to ozone to reduce carbon monoxide from the exhaust gas.

U.S. patent application Ser. No. 11/343,031 entitled "Method and Apparatus for Coloring Motor Exhaust Fumes", which application is incorporated herein for purposes of reference, describes a simple arrangement for directing light onto motor exhaust fumes without discoloring the light source.

There is recent indication that the high quantities of carbon monoxide released by auto exhausts chemically react with the ozone in the "Ozone Layer" causing depletion thereof.

One purpose of the instant invention is to provide an add-on motor exhaust ozonator adapter to existing automobiles, motorcycles, snow mobiles and the like whereby ultraviolet light provides ozone gas to the exhaust effluent to convert the carbon monoxide therein to carbon dioxide.

A further purpose of the invention is to reduce the amount of toxic effluents emitted by diesel engines, for example.

SUMMARY OF THE INVENTION

A motor exhaust ozonator adapter is proposed wherein one arm of the adapter is connected with the end of a motor vehicle exhaust pipe for receiving and passing exhaust gas without interference.

Another arm of the adapter houses a powerful ozone light source for ozonating an intake air source. The ozonated air is mixed with the exhaust gas egress for converting carbon monoxide therein to carbon dioxide and oxidizing other noxious chemicals to thereby decrease atmosphere contamination.

DESCRIPTION OF THE PREFERRED EMBODIMENT

Figure 1:
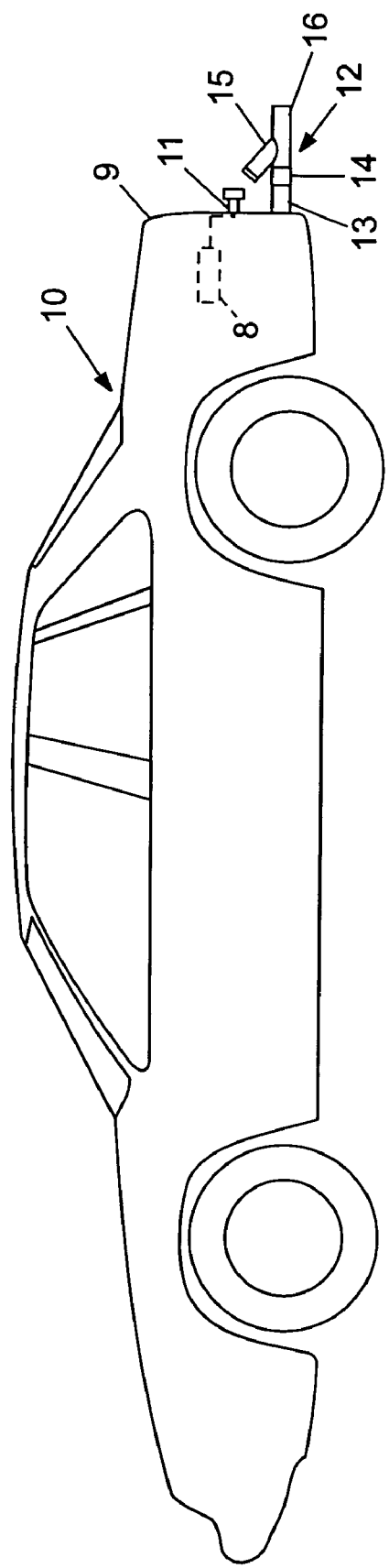
FIG. 1 is a side view of an automobile having the motor exhaust ozonator adapter of the invention attached thereto.

In FIG. 1, an automobile 10 is depicted having a standard motor exhaust pipe 13 extending beneath the automobile rear bumper 11. In accordance with the invention, a two-part motor exhaust ozonator adapter, hereafter "adapter", 12 is connected to the exhaust pipe 13 via the coupler 14. An ultraviolet light source 22 (FIG. 2) is connected with the angulated arm 15 of the adapter 12 to produce ozone gas, which is mixed with the effluent motor exhaust gas flow within the extension 16 in the manner to be described below.

The ultraviolet light source 22 connects with a lamp ballast 8 contained within the automobile trunk 9.

Figure 2:
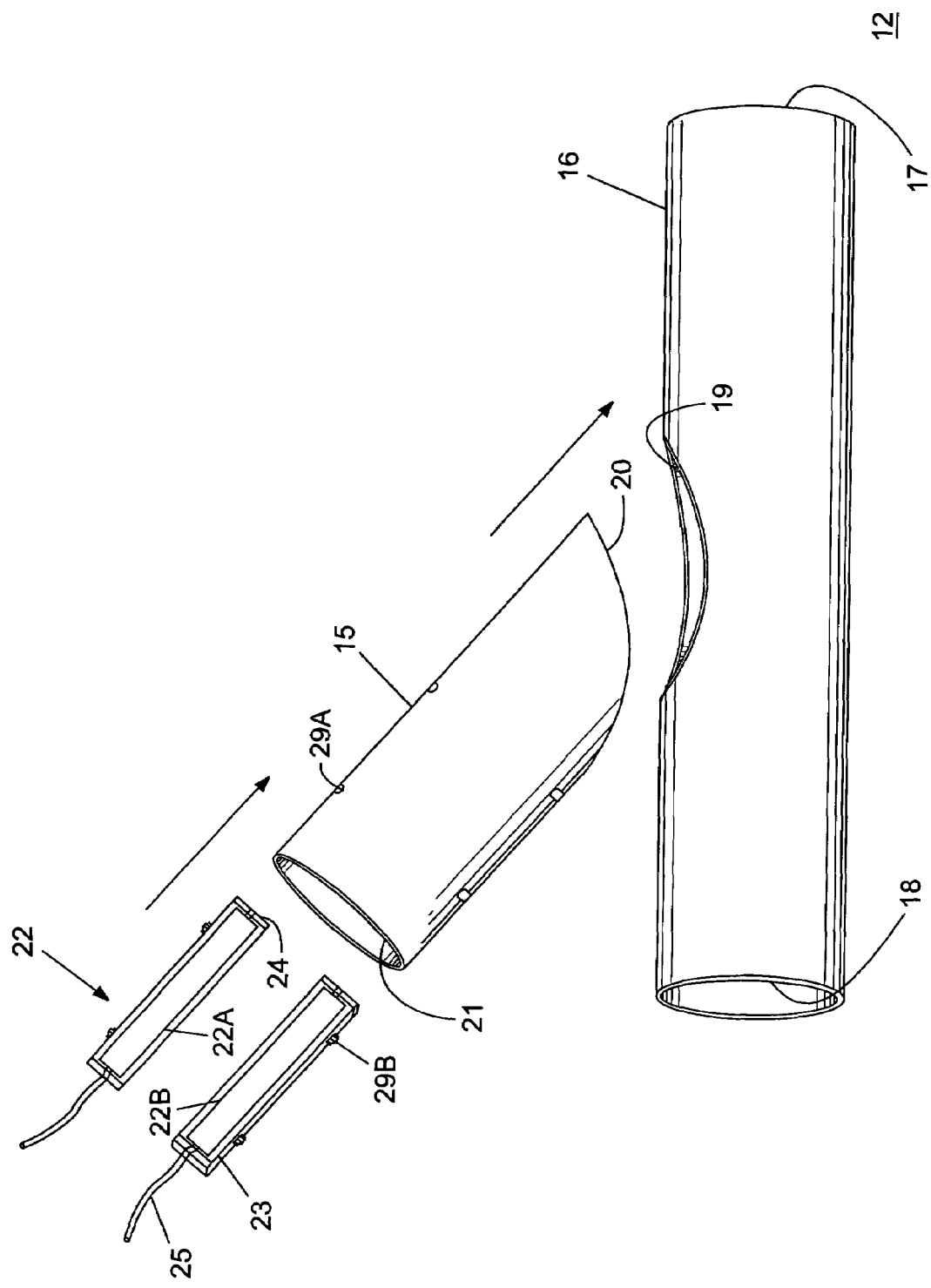
FIG. 2 is a front perspective view of the motor exhaust ozonator adapter of FIG. 1 with the components in isometric projection.
Figure 3:
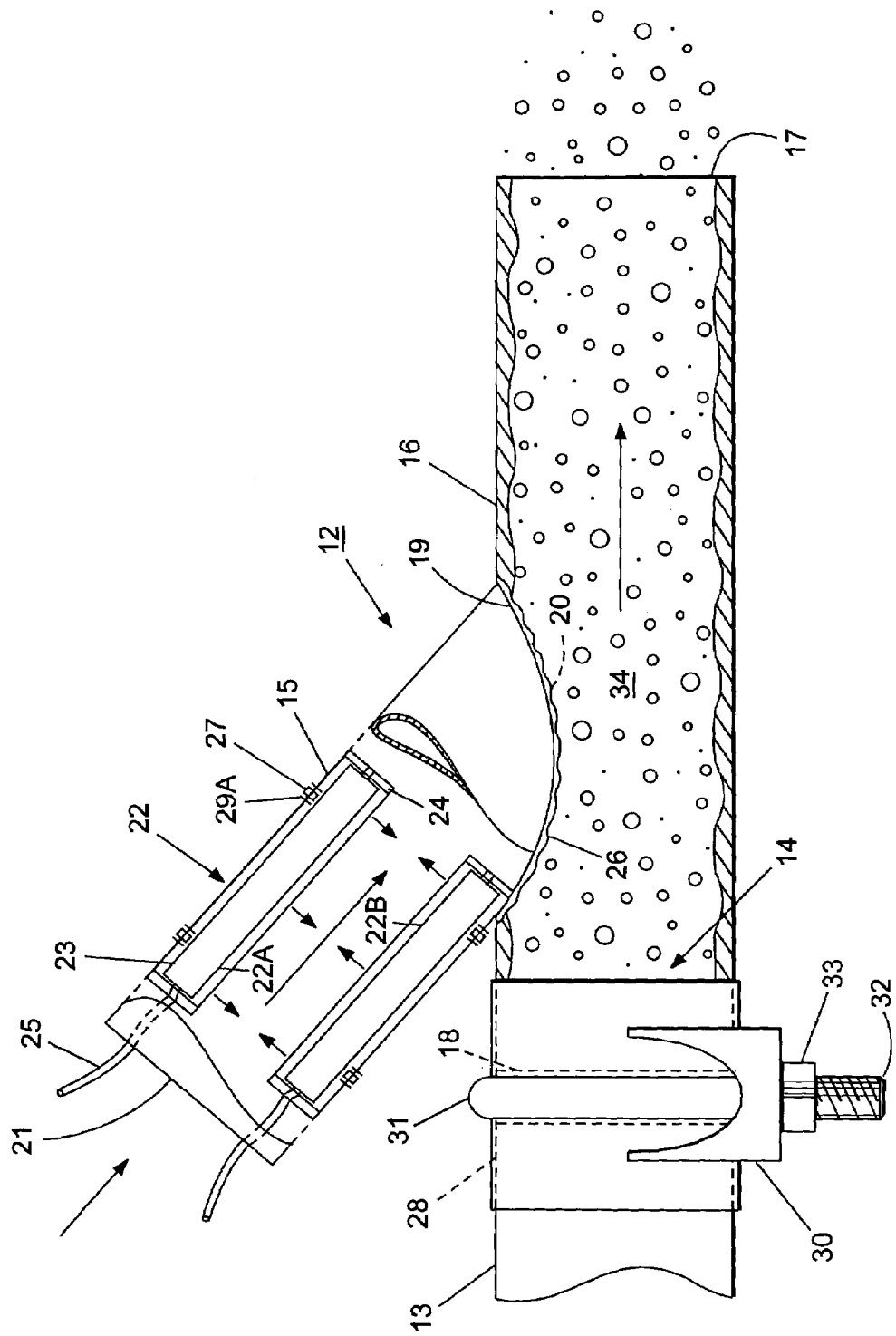
FIG. 3 is an enlarged side view of the motor exhaust ozonator adapter of FIG. 2 connected to the exhaust pipe of FIG. 1.

The adapter 12 is shown in FIG. 2 prior to positioning the front opening 20 of the angulated arm 15 onto the aperture 19 of the pipe extension 16 and welding the arm to the extension as depicted at 26 in FIG. 3.

Referring now to both FIG. 2 and FIG. 3, the pipe extension 16 defines a front opening 18 at one end for intake of the exhaust gas 34 and a rear opening 17 at an opposite end for egress of the exhaust gas.

The light support base 23 including the ozone light source 22, such as a pair of Ster-L-Ray Slimline lamps 22A, 22B, obtained from Atlantic Ultraviolet Corp., connecting therewith via sockets 24, is next inserted within the front opening 21 of arm 15 and includes wire conductors 25 for connection with the lamp ballast 8 contained within the trunk 9 of the automobile 10, as shown earlier in FIG. 1.

The support base 23 includes a pair of threaded apertures 29B which align with the clearance openings 29A on the arm 15 for receiving a pair of set screws 27, as shown in FIG. 3.

The attachment of the base 23 within the rear opening 21 of the arm 15 and the attachment of adapter 12 to the automotive exhaust pipe 13 is also shown in FIG. 3, wherein the front opening 18 of the pipe extension 16 is inserted within one end of the coupler 14 and the end 28 of the exhaust pipe 13 is inserted within the opposite end thereof.

A conventional U-bolt 31 is positioned over the coupler 14 and is attached to the coupler by means of the C-shaped clamp 30 which extends on both sides of the coupler and is attached on both sides of the coupler by nuts 33 and threaded ends 32 of the U-bolt 31, although only one side is depicted herein.

With the wire conductors 25 connected with the ballast 8 (FIG. 1), the lamps 22A, 22B emit ultraviolet light in the indicated direction within the angulated arm 15 to illuminate the incoming air entering the rear opening 21 of the angulated arm 15 and passing thru the angulated arm, as also indicated.

Upon flow of the exhaust gases 34 thru the pipe extension 16, a partial vacuum occurs within the angulated arm 15, thereby promoting air flow in the indicated direction into the rear opening 21 of the arm 15, and between the light source 22 consisting of lamps 22A, 22B into contact with the exhaust gas particles 34 whereby the ozone gas created thereby (not shown) is brought into contact with the carbon monoxide gas (not shown) to convert the carbon monoxide gas to carbon dioxide gas (also not shown) within the pipe extension 16 thereby decreasing the amount of carbon dioxide gas exiting the front opening 17 of the pipe extension 16 out into the surrounding atmosphere.

A motor exhaust ozonator adapter has herein been described whereby one part of the adapter is connected with ozone generating light source and another part of the adapter is connected with the automotive exhaust pipe. The ultraviolet light source accordingly generates ozone gas, which converts the carbon monoxide gas within the exhaust gas effluent to carbon dioxide as well as oxidizing other exhaust gas components to help prevent contamination of the surrounding atmosphere.

What is claimed is:

1. An adapter for connecting with a motor vehicle exhaust pipe for converting carbon monoxide within exhaust gas effluent to carbon dioxide comprising:
   a first cylinder joined at an angle to a second cylinder in a Y-shaped configuration, wherein an opposite end of said first cylinder is joined to an opening in said second cylinder proximate said one end of said second cylinder;

illumination means within one end of said first cylinder for generating ozone gas; and connection means arranged proximate one end of said second cylinder for connection with an exhaust pipe whereby said ozone gas from said first cylinder mixes with exhaust gas from said exhaust pipe to remove carbon monoxide from said exhaust gas.

2. The adapter of claim 1 wherein said first cylinder is of a first length and said second cylinder is of a second length, said first length being shorter than said second length for directing contact between said illumination means and said exhaust gas effluent.

3. The adapter of claim 1 wherein an opposite end of said second cylinder is arranged for exiting of said exhaust gas effluent away from said exhaust pipe.

4. The adapter of claim 1 wherein said first pipe is welded to said second pipe.

5. The adapter of claim 1 wherein said illumination means is adapted for connection with an a motor vehicle rear light for providing illumination to said exhaust gas effluent when said rear light is actuated.

6. The adapter of claim 1 wherein said illumination means is adapted for connection with an a motor vehicle brake light for providing illumination to said exhaust gas effluent when said brake light is actuated.

7. The adapter of claim 1 wherein said illumination means is adapted for connection with a motor vehicle rear light for providing illumination to said exhaust gas effluent when said rear light is actuated.

* * * * *